May 11, 1965   E. S. WOODHALL   3,182,587
APPARATUS FOR CALENDERING OR SHEETING DEFORMABLE MATERIAL
Filed Jan. 19, 1962   3 Sheets-Sheet 1

INVENTOR.
EDWIN S. WOODHALL
BY
J. B. Holden
ATTORNEY

May 11, 1965   E. S. WOODHALL   3,182,587
APPARATUS FOR CALENDERING OR SHEETING DEFORMABLE MATERIAL
Filed Jan. 19, 1962   3 Sheets-Sheet 2

INVENTOR.
EDWIN S. WOODHALL
BY
*J. B. Holden*
ATTORNEY

May 11, 1965  E. S. WOODHALL  3,182,587
APPARATUS FOR CALENDERING OR SHEETING DEFORMABLE MATERIAL
Filed Jan. 19, 1962  3 Sheets-Sheet 3

INVENTOR.
EDWIN S. WOODHALL
BY
*J. B. Holden*
ATTORNEY ated May 11, 1965

United States Patent Office 3,182,587
Patented May 11, 1965

3,182,587
APPARATUS FOR CALENDERING OR
SHEETING DEFORMABLE MATERIAL
Edwin S. Woodhall, Cuyahoga Falls, Ohio, assignor to
The Goodyear Tire & Rubber Company, Akron, Ohio,
a corporation of Ohio
Filed Jan. 19, 1962, Ser. No. 167,322
5 Claims. (Cl. 100—47)

This invention relates to an apparatus for performing sheeting operations or shaping operations, such as are employed in a calender or rolling mill to produce a sheet of material of uniform thickness under heavy pressure. It is understood that the apparatus is not restricted to use with material of any particular type but may be used, for example, for rolling or calendering sheets of plastic, rubber, paper, metal, or any other material which is passed through sheeting or calendering rolls.

When plastic, or other deformable material, rubber, paper or metal, is passed through rolls to be delivered in the form of sheets, it is usually essential that the sheet which is delivered be of uniform or substantially uniform thickness throughout its width and this uniformity must be maintained within very fine limits, particularly when the end product is of very thin gauge. In certain sheeting operations, variations in thickness transversely of the sheet of a few thousandths or ten thousandths of an inch may be highly objectionable, for instance, in the plastic sheeting field where the plastic material is being calendered into sheets for use as films, variations in the thickness of a few thousandths of an inch across the width are observable and may render the film material second grade.

It has been the standard practice in rubber, plastic, and other arts of the character referred to, to form the calender and like rolls with substantially cylindrical surfaces which have a slight positive or negative crown resulting in a slightly concave or convex longitudinal profile, that is, the rolls are made in the first instance with a few thousandths of an inch greater diameter near the center than exists at the ends of the working surfaces. The crown produces a roll profile in the form of a flat curve well understood by those skilled in the art. The advantages of crowned calender rolls have long been recognized and appreciated in the art. The degree of crown and the crown shape are so designed that the roll surfaces, between which the material is passed, are substantially uniformly spaced from each other throughout the length of the rolls under a given set of operating conditions. However, the operating conditions necessarily are of a variable character and frequently change. These variables include, among others, the physical characteristics of the material being processed, the consistency or plasticity of such material, the gauge of such material, the operating temperature, operating speed, operating pressure and roll wear. Changes in these variables in turn result in different separating forces acting upon the surfaces of the cooperating rolls so that the designed crown on the roll which was predetermined for one gauge, speed, and particular plastic, does not produce substantially uniformly spaced roll surfaces under the new conditions of operation. Therefore, roll crowning usually is a compromise of the best roll profile or necessitates frequent changes to rolls of different crowns.

It is also known that the profile shape of the roll may be changed by "cross axis" mechanisms in which the axes of the rolls are set at a predetermined angle so that more pressure is exerted, for example, at the center than at the ends of the roll. Another method of changing the roll profile is by bending the rolls into an arcuate shape by pressure applied at the ends of the roll to bring the surfaces of the rolls into substantial parallelism for any given set of operating conditions. However, both of the latter methods of correcting for variations in operating conditions are limited to one particular roll profile which is symmetrical with the center of the roll.

It is the general object of this invention to avoid and overcome at least some of the difficulties and objections to known sheeting or coating operations by providing an apparatus and method for thermally controlling or adjusting the crown of at least one of a pair of cooperating rolls during operation of the roll to achieve substantially uniformity of thickness of material being operated upon by the rolls.

Another object of the invention is to provide an apparatus for sheeting plastic or deformable material in which the longitudinal profile of the roll may be thermally controlled or adjusted during operation of the rolls so that the cooperating work surfaces of the rolls are positioned substantially equal distances apart over their entire length to achieve substantial uniformity of transverse thickness of the material being operated upon by the rolls.

Another object of the invention is to provide an apparatus of the character described in which the longitudinal profile of the roll is thermally controlled or adjusted in response to variations in the spacing between the rolls occurring during operation so as to bring the surfaces thereof into parallel relationship.

Another object of the invention is to provide an apparatus of the character described in which the roll profile is thermally controlled or adjusted so as to expand or contract certain portions or zones axially of the roll during operation of the rolls to achieve substantial uniformity of transverse thickness of the material being operated upon by the rolls.

For a better understanding of the invention, reference should be made to the following description and the accompanying drawings, in which.

Figure 1:
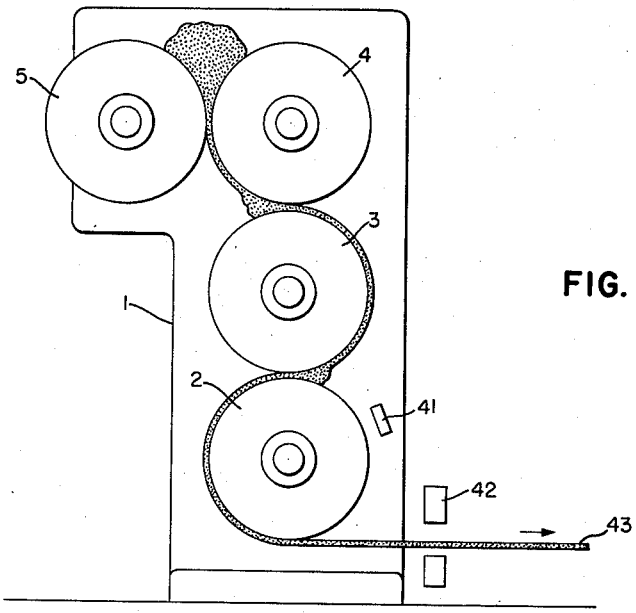
FIG. 1 is a vertical end view with parts broken away of a set of rolls.

Referring to the drawings, in which a preferred form of the invention is illustrated, a calender or like apparatus is shown including a frame 1 having a plurality of rolls 2, 3, 4, and 5 cooperating to perform a sheeting coating or like operation to form thin sheets of plastic material, and the like. It will be understood that the invention is equally applicable in the manufacture of sheets or films of other material, such as rubber, paper, metals, and the like. Each of the rolls 2 through 5 are provided with reduced diameter journals 6 carried in bearings 7 which in turn are supported on the frame 1. The bearings 7 are normally supported by the frame in fixed vertical position and the remaining roll bearings are supported in slidable, vertical position and provided with suitable means for adjusting the distances between the rolls.

Figure 3:
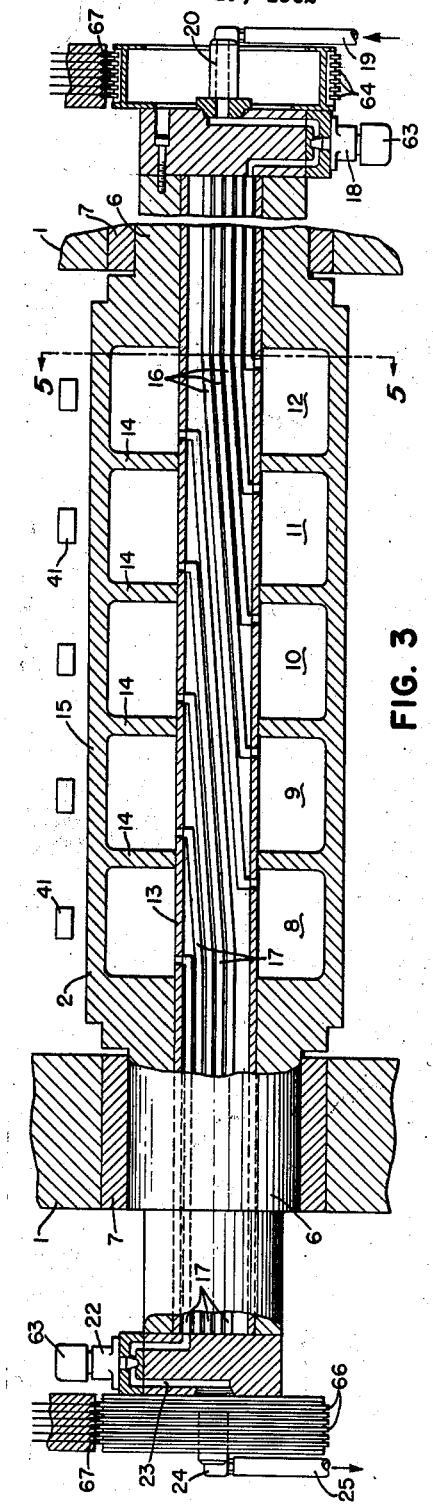
FIG. 3 is a longitudinal view with parts broken away and in cross section showing one form of the apparatus of this invention.

In accordance with this invention, at least the last roll 2 of the train of rolls is divided or sectionalized into a plurality of chambers 8 through 12 formed concentrically about a central cylinder 13. The chambers 8 through 12 are separated laterally from each other by intervening ribs 14 extending from the radial outer wall 15 of each of the chambers into fluid-tight contact with the cylinder 13. Each of the chambers 8 through 12 are, respectively, connected to independent conduits 16 and 17, the conduits 16 each providing for emitting a heating medium to one of the chambers, and the conduits 17 each providing for egress of the heating fluid from one of the chambers. Each of the respective pairs of conduits 16 and 17 are connected to a remotely controlled and actuated valve 18 located at the end of the roll 2. As shown in FIG. 3 of the drawings, a heating fluid enters the pipe 19 through a rotating coupling 20 and enters one of the passages to one of the valves 18 and then through a conduit 16 to any given heating chamber 8 through 12. Egress of the heating fluid follows a similar path through one of the pipes 17 through a respective valve 22, through the passage 23, the rotating coupling 24, and then to the exhaust pipe 25. Each of the valves 18 and 22 are independently and remotely actuated as will be fully explained hereinafter.

In accordance with this invention, one or more zones or portions of the roll 2 is thermally controlled so that a given zone may be expanded or contracted relative to the other axially located zones to thereby thermally expand such zones to control the profile or crown of the roll. For purposes of illustrating, and without being limited thereto, a typical calender roll having a diameter of 24 inches and made of cast iron can be expanded at the central portion thereof relative to the ends by raising the temperature of the roll face at the center portion 14° F. above the temperature of the roll face at the ends of the roll. It will be recognized that the relatively small deflections or expansions obtained are greatly exaggerated in the drawings to better illustrate the principle involved. However, it is to be understood that the expansions and contractions of the various zones of the roll of the indicated amounts are adequate in many sheeting operations to render the calender material of relatively uniform thickness transversely of the sheet.

Figure 2:
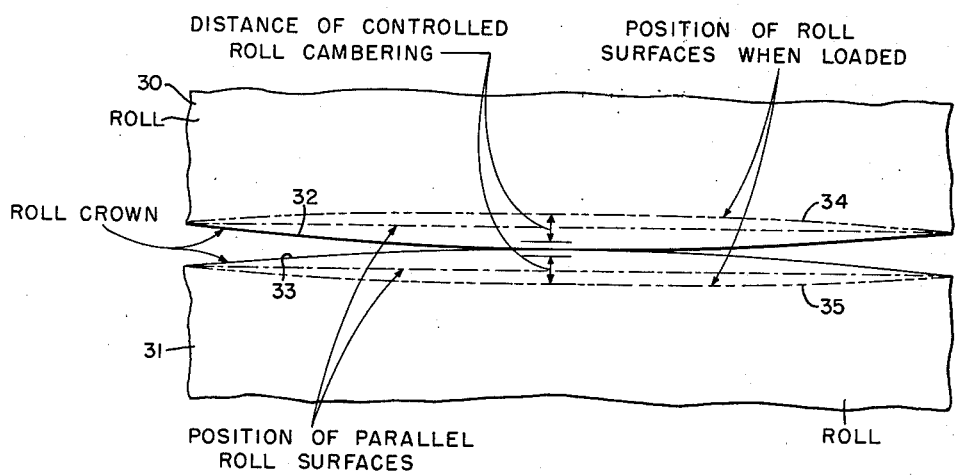
FIG. 2 is an enlarged schematic and exaggerated longitudinal section through a pair of cooperating roll surfaces, and illustrating the principle of the invention as they appear in operation of the working surfaces of the rolls.
Figure 4:
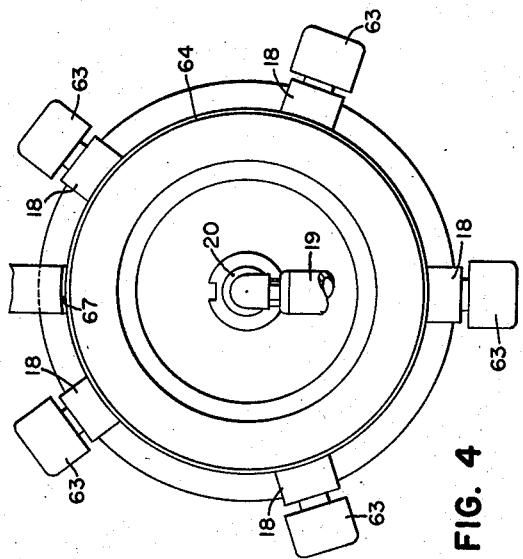
FIG. 4 is an end view of the apparatus shown in FIG. 3.
Figure 5:
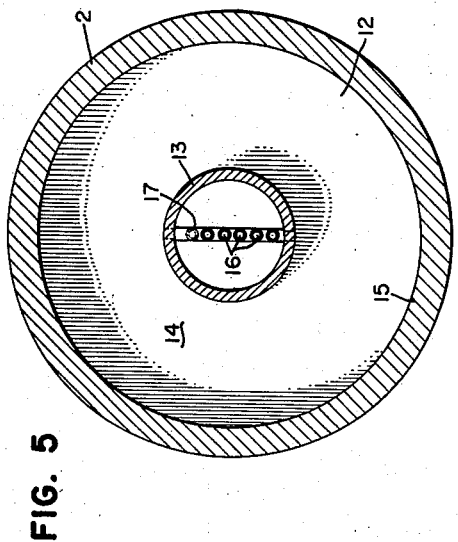
FIG. 5 is a cross-sectional view taken along the lines 5—5 of FIG. 3.

FIG. 2 illustrates in more detailed form the principle of thermally expanding and contracting the roll as provided by this invention and employing the apparatus shown in FIGS. 3 through 5 of the drawings. In FIG. 2, the rolls 30 and 31 normally have working surfaces or roll crowns indicated respectively by the numerals 32 and 33 which are designed such that when the rolls 30 and 31 are subject to operating pressures on a given plastic, these surfaces will move to positions indicated by the chain-dotted lines 34 and 35. Specifically, it is the conventional practice to so form the curvature of the working surfaces of the rolls so that when the rolls are subjected to operating pressures, the working surfaces of the rolls will be in substantial parallelism over the entire length. In accordance with this invention, the working surfaces of the rolls whether they are originally crowned or not, are thermally controlled so that the working surfaces of the rolls can be moved back to a position of parallelism, regardless of changes in the operating forces tending to move the rolls out of parallelism and regardless of other changes in the operating conditions of the calender, such as the calender speed, temperatures, gauges being operated upon, the character and plasticity of the material, and the like.

Figure 6:
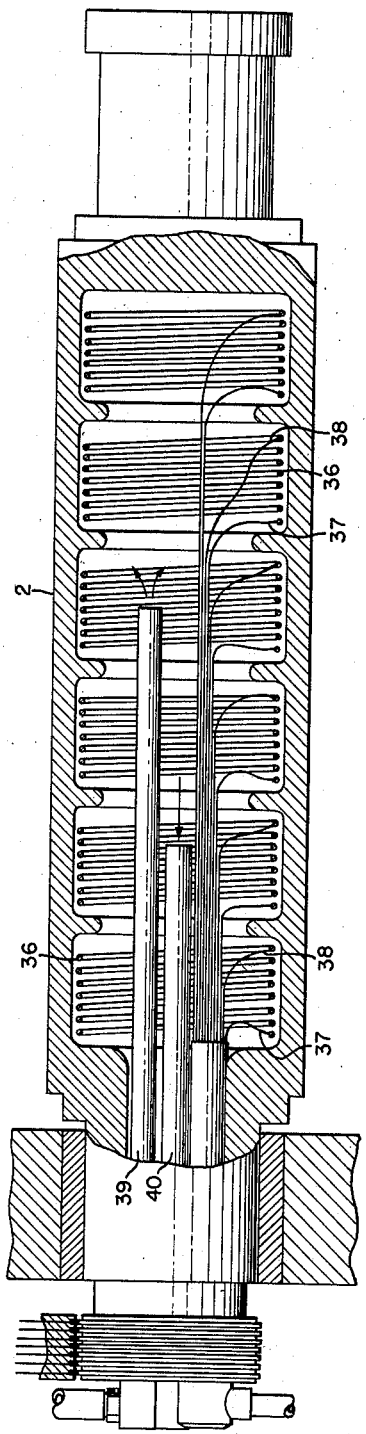
FIG. 6 is a longitudinal sectional view similar to FIG. 3 showing a modification of the apparatus of the invention.

Having reference now to FIG. 6 of the drawings, another specific embodiment is illustrated in which the calender roll includes a plurality of axially spaced heating elements 36 located internally of the roll and each of which is provided with a respective lead line 37 and 38, so that the heating elements 36 are each individually energized in a manner to be more specifically described hereinafter. In addition to the heating elements, a conventional source of a heating medium may be injected into the roll through pipe 39 and evacuated therefrom from the exhaust pipe 40. Since, in accordance with this invention, the longitudinal profile or crown of the roll is controlled by thermally controlling axially spaced zones of the roll, it is within the concept of this invention that the distances at the bite of two cooperating rolls be indirectly measured, either by a plurality of thickness gauges which measure the thickness of the resulting sheet at a plurality of points transverse of the sheets, or by a plurality of temperature gauges which measure the temperature of the roll 2 at each of the zones or portions of the roll controlled by the heating chambers 8 through 12, or the electrical heating elements 36. In FIG. 1 of the drawings, numeral 41 indicates a device for continuously measuring the temperature of the roll 2, and numeral 42 indicates a beta ray gauge which measures the thickness of the film 43. It is understood that a plurality of such temperature sensing devices 41 or a plurality of thickness sensing devices 42 shall be used depending upon whether the variable to be measured is the temperature of the roll 2 or the thickness of the resultant film 43. In other event, the output of each gauge 41 and 42 is transmitted to a suitable temperature control circuit which in turn actuates one of the valves 18 for emitting a heating medium into one of the chambers 8 through 12. If the radiant heating devices shown in FIG. 6 are used, the output from the sensor 41 or 42 is fed into a similar control circuit, which directly energizes and deenergizes one or more of the radiant heaters 36 in response to variations in the variable which is measured.

Figure 7:
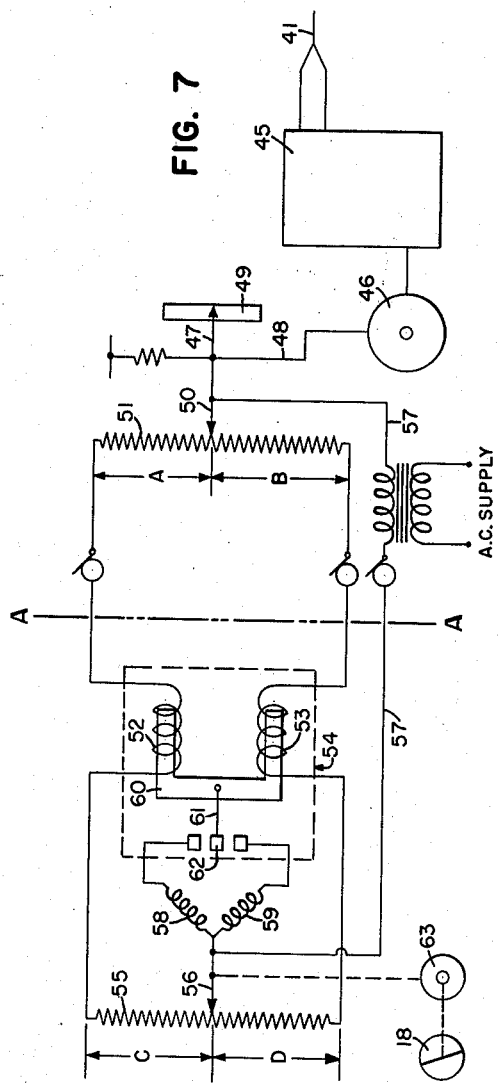
FIG. 7 is an illustration of the electrical control circuit utilized in the apparatus of this invention.

Referring to FIG. 7 of the drawings, the variable output of the temperature sensing device 41, which may be a radiation pyrometer, such as a Radiamatic Detector, manufactured by the Minneapolis Honeywell Regulator Company, is fed directly to a conventional indicating potentiometer controller 45. The controller 45 is provided with a reversible motor 46 which is energized to rotate in the proper direction and amount in response to a change in the output of the temperature sensing device 41 and moves an indicator 47 attached to a cable 48 relative to a scale 49. A contact slider 50 is also attached to the cable 48 and is thereby moved along a rheostat or resistance 51 which is connected in series with the coils 52 and 53 of the balancing relay 54 which are in turn connected in series with the rheostat 55. A slider 56 is connected by the line 57 to the slider 50 as well as to the motor coils 58 and 59. Assuming that the sensor 41 senses the temperature of the roll surface and that the temperature sensed is at the set point of the controller 45, the rheostat 51 and rheostat 55 will be divided by the respective sliders 50 and 56 so that the resistance $A+C$ is equal to the resistance $B+D$. The coils 52 and 53 of the balancing relay are then equally energized and the armature 60 will maintain the contact arm 61 at the neutral point 62 so that no current will flow to the motor windings 58 or 59. When the temperature of the roll is at the set point, the valve motor 63 of the valve 18 is open an amount proportional to maintaining the particular set temperature. As the temperature of the sensing device 41 varies from the set point a correction proportional to the amount of deviation is made to bring the temperature back to the set temperature.

Assuming that the temperature of the roll decreases, the slider 47 will be moved to the left of FIG. 7 and likewise the slider 50 will be moved to the left thereby causing the resistance BD to be greater than the resistance AC. A greater amount of current now flows through the left leg of the circuit and the coil 52 of the balancing relay exerts a greater force on the armature 60 than the coil 53. The armature 60 will, therefore, rotate clockwise making contact to the side of the circuit that sends current directly to the motor winding 58 causing the motor 63 to move the slider 56 to a position to rebalance the circuit so that the resistance $A+C=B+D$ and no current flows to the motor 63. The motor 63 thus actuates the valve 18 so that more heating fluid flows into the zone of the roll control between the valve thereby raising the temperature thereof. The resulting change in the temperature is sensed by the sensing element 41 and the valve is rethrottled in the manner described to a new position.

It is to be understood that the roll 2 may be divided into any required number of zones or heaters and the amount of heating medium, either fluid or electrical energy supplied to each zone or heater is separately and individually controlled by independent circuits, as shown in FIG. 7. In other words, a sensing device 41 or 42 is associated with each zone or heater to be controlled and each sensing device is connected to a suitable electric control circuit, such as that shown in FIG. 6, so that each respective motor actuated valve 18 is throttled or opened and closed to control the ingress and egress of a heating medium to the particular zone, or to control the energization of the particular electric heater 36, shown in FIG. 6.

All of the valves 18 and all of the valves 22, as well as their motors 63, are mounted on the roll 2 and rotate with the roll. As shown in FIG. 7, that portion of the circuit to the left of the line A—A is made integral with the motor for each valve and is connected electrically with that portion of the circuit to the right of line A—A of FIG. 7 by means of suitable rings 64 and brushes 67 which are mounted on the end of the roll 2. The rings 64 are suitably insulated from each other and from the roll 2. Likewise, the motors for the valves 22, at the exhaust end of the roll, are controlled and energized in the same manner as the motors for valves 18. A set of rings 66, and associated brushes 67, are mounted on the end of the roll 2 adjacent the valves 22.

In the event that the temperature of the roll 2 is controlled by resistance type heaters 36, as shown in FIG. 6 of the drawings, the electrical control circuit, shown in FIG. 7, can obviously be readily modified by substituting for the valve 18 an adjustable rheostat for increasing or decreasing the energization of heaters 36 in any of the zones of the roll.

It is understood that as used herein, the term "heater" shall mean an enclosed chamber into which a heating fluid, either gaseous or liquid, may be injected, or an independently electrically energized resistance or infra-red heater.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for roll forming sheeting material of uniform thickness transversely of the sheet comprising, a plurality of cooperative rolls for forming a sheet therebetween, one of said rolls having a plurality of heaters located internally of the roll and spaced axially of the roll to heat axially spaced portions of said one roll, a plurality of sensing devices for sensing the profile of said roll at axially spaced portions thereof, and control means responsive to the output of said sensing means to activate said heaters to independently control the temperature of each of said heaters and thereby bring the surfaces of the roll into substantial parallelism regardless of the pressure required to affect the sheeting of the material.

2. An apparatus for roll forming sheet material of uniform thickness transversely of the sheet comprising a plurality of cooperative rolls for forming a sheet therebetween, a plurality of temperature sensing devices for sensing the temperature of axially spaced portions of at least one of said rolls, said one roll having a plurality of fluid containing chambers spaced axially of the roll which are each concentric with the axis of the roll, a plurality of pairs of conduits, one pair of conduits communicating respectively with each of said chambers for carrying temperature controlling fluid to and from each chamber independently of the other chambers, a valve for each of said conduits, and a control circuit responsive to the output of each temperature sensing device to actuate the respective valve to admit temperature controlling fluid to the respective chamber, whereby the roll diameter may be increased or decreased at axially spaced portions of said roll to bring the axis of the rolls into substantial parallelism regardless of the pressure required to affect the sheeting of the material.

3. An apparatus for roll forming sheeting material of uniform thickness transversely of the sheet comprising, a roll, a plurality of annular radiant heaters located internally of the roll and spaced axially of the roll to heat axially spaced portions of said one roll and control means for independently energizing said heaters to selectively thermally expand at least one of said annular portions to thereby bring the surfaces of the roll into substantial parallelism rgeardless of the pressure required to affect the sheeting of the material.

4. An apparatus for roll forming sheet material of uniform thickness transversely of the sheet comprising, a plurality of cooperative rolls for forming a sheet therebetween, said rolls having journalled ends with a working area therebetween, the working area of one of said rolls having a plurality of isolated annular heating chambers located internally of the roll and spaced axially of the roll to heat axially spaced annular portions of said roll between said journals, a plurality of conduits equal in number to said chambers, each connected respectively to one chamber for independently supplying heating fluid respectively to each of said heating chambers, exhaust means for each of said chambers and valve means associated with each of said conduit means adapted to vary the amount of heating fluid supplied to each of said chambers, and control means to independently selectively actuate each of said valve means to thereby selectively thermally expand at least one of said annular portions to bring the surfaces of the roll into substantial parallelism regardless of the pressure required to affect the sheeting of the material.

5. An apparatus as claimed in claim 4 in which said exhaust means includes a plurality of exhaust conduits equal in number to said chambers for independently exhausting heating fluid respectively from each of said heating chambers, and valve means associated with each of said exhaust conduits adapted to vary the amount of heating fluid exhaust from each of said chambers.

References Cited by the Examiner
UNITED STATES PATENTS

| | | | |
|---|---|---|---|
| 1,982,571 | 11/34 | Clark. | |
| 2,011,748 | 8/35 | Boyd | 100—93 X |
| 2,184,908 | 12/39 | Chan. | |
| 2,603,457 | 7/52 | Bishop | 165—89 |
| 2,780,443 | 2/57 | Holloway | 165—89 |
| 2,793,006 | 5/57 | Eaby | 165—89 |
| 2,867,414 | 1/59 | Maloney et al. | 100—93 |
| 2,933,760 | 4/60 | Heide. | |
| 2,970,339 | 2/61 | Hausman. | |
| 2,981,175 | 4/61 | Goyette | 100—93 |
| 3,006,610 | 10/61 | Siegel | 165—89 |

WALTER A. SCHEEL, *Primary Examiner.*

A. G. STONE, *Examiner.*